United States Patent
Erickson et al.

(10) Patent No.: US 7,249,855 B2
(45) Date of Patent: Jul. 31, 2007

(54) SYSTEM AND METHOD OF IMAGE ENHANCEMENT THROUGH LIGHT INTENSITY MODULATION IN DIGITAL PROJECTORS

(75) Inventors: David L. Erickson, Corvallis, OR (US); Kevin Hulick, Corvallis, OR (US); Anurag Gupta, Corvallis, OR (US); P. Guy Howard, Junction City, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 206 days.

(21) Appl. No.: 11/019,695

(22) Filed: Dec. 21, 2004

(65) Prior Publication Data
US 2006/0132717 A1 Jun. 22, 2006

(51) Int. Cl.
*G03B 21/00* (2006.01)
*G03B 21/14* (2006.01)

(52) U.S. Cl. .......................... 353/97; 353/121
(58) Field of Classification Search ................ 353/30, 353/69, 97, 121; 362/551, 552, 583; 385/25, 385/31
See application file for complete search history.

(56) References Cited

U.S. PATENT DOCUMENTS

| | | | |
|---|---|---|---|
| 4,675,500 A | 6/1987 | Kunz et al. | |
| 5,442,414 A | 8/1995 | Janssen et al. | |
| 5,597,223 A | 1/1997 | Watanabe et al. | |
| 6,377,336 B1 * | 4/2002 | Shiraishi et al. | 355/67 |
| 6,457,833 B1 | 10/2002 | Ishikawa et al. | |
| 6,474,819 B2 | 11/2002 | Yoder et al. | |
| 6,558,007 B2 | 5/2003 | Nakagawa et al. | |
| 6,561,656 B1 | 5/2003 | Kojima et al. | |
| 6,601,959 B2 | 8/2003 | Miyata et al. | |
| 6,637,894 B2 | 10/2003 | Dewald et al. | |
| 6,683,657 B1 | 1/2004 | Miyawaki | |
| 6,783,249 B2 | 8/2004 | Yoneyama | |
| 6,799,852 B2 | 10/2004 | Sekiguchi et al. | |
| 2002/0118310 A1 | 8/2002 | DeLong | |
| 2002/0145707 A1 * | 10/2002 | Yoneyama | 353/84 |
| 2002/0180939 A1 | 12/2002 | Miyata et al. | |
| 2003/0020839 A1 | 1/2003 | Dewald | |
| 2003/0142241 A1 | 7/2003 | Allen et al. | |
| 2003/0142296 A1 | 7/2003 | Schmidt et al. | |
| 2003/0147052 A1 | 8/2003 | Penn et al. | |
| 2003/0202259 A1 | 10/2003 | Nishimae et al. | |
| 2003/0227577 A1 | 12/2003 | Allen et al. | |
| 2004/0004675 A1 | 1/2004 | Honda | |
| 2004/0008288 A1 | 1/2004 | Pate et al. | |
| 2004/0119950 A1 | 6/2004 | Penn et al. | |
| 2004/0135975 A1 | 7/2004 | Wang | |
| 2004/0165156 A1 | 8/2004 | Akiyama | |
| 2004/0169829 A1 | 9/2004 | Kwon | |
| 2004/0201828 A1 | 10/2004 | Wang | |

FOREIGN PATENT DOCUMENTS

| | | |
|---|---|---|
| EP | 0 757 278 A | 2/1997 |
| EP | 0 749 250 | 4/2002 |
| JP | 2001-144770 A | 5/2004 |
| JP | 2004-157401 | 5/2004 |
| JP | 2004 157401 * | 6/2004 |

OTHER PUBLICATIONS

Philips' Fluid Lenses: Digital Photography Review (http://www.dpreview.com/news/0403/04030302philipsfluidlens.asp) Mar. 3, 2004 pp. 1-3.

* cited by examiner

*Primary Examiner*—Rodney Fuller

(57) ABSTRACT

Systems and methods for image enhancement are disclosed. The system includes a light source adapted to generate a light beam and a light integration unit positioned along a light path of the light beam. A light intensity modulator is positioned between the light source and an exit of the light integration unit.

13 Claims, 8 Drawing Sheets

SYSTEM AND METHOD OF IMAGE ENHANCEMENT THROUGH LIGHT INTENSITY MODULATION IN DIGITAL PROJECTORS

BACKGROUND OF THE INVENTION

The present invention relates generally to the field of digital projectors. In particular, the invention relates to enhancing the image generated by digital projectors using a light disruption in the illumination portion.

Digital projectors have gained prominence in recent years. A typical projector arrangement 100 includes an illumination portion 110, a projection portion 120 and an image processing portion 130. The illumination portion 110 includes a light source, an integrating rod and one or more lenses directing the light to the image processing portion 130. The processed image is then directed from the image processing portion 130 through the projection portion 120 to, for example, a screen. The projection portion also includes one or more lenses to direct and/or focus the image onto the screen.

The image processing portion can typically contain an image processing device, such as a digital micromirror device (DMD). Such devices are often apertureless and require external modulation of the light intensity to enhance the image quality. In conventional rear-projection digital projectors, contrast of the projected image can be enhanced by modulating the light intensity by placing an adjustable aperture in the projection portion. However, this arrangement is not feasible for most forward-projection systems since most such systems use zoom projection lenses that make it difficult to place an adjustable aperture.

It is desirable to achieve systems and methods for enhancing the contrast of the image in forward-projection digital projectors.

DETAILED DESCRIPTION OF THE PREFERRED EMBODIMENTS

It is to be understood that both the following detailed description is exemplary and exemplary only, and is not restrictive of the invention as claimed.

Figure 1:
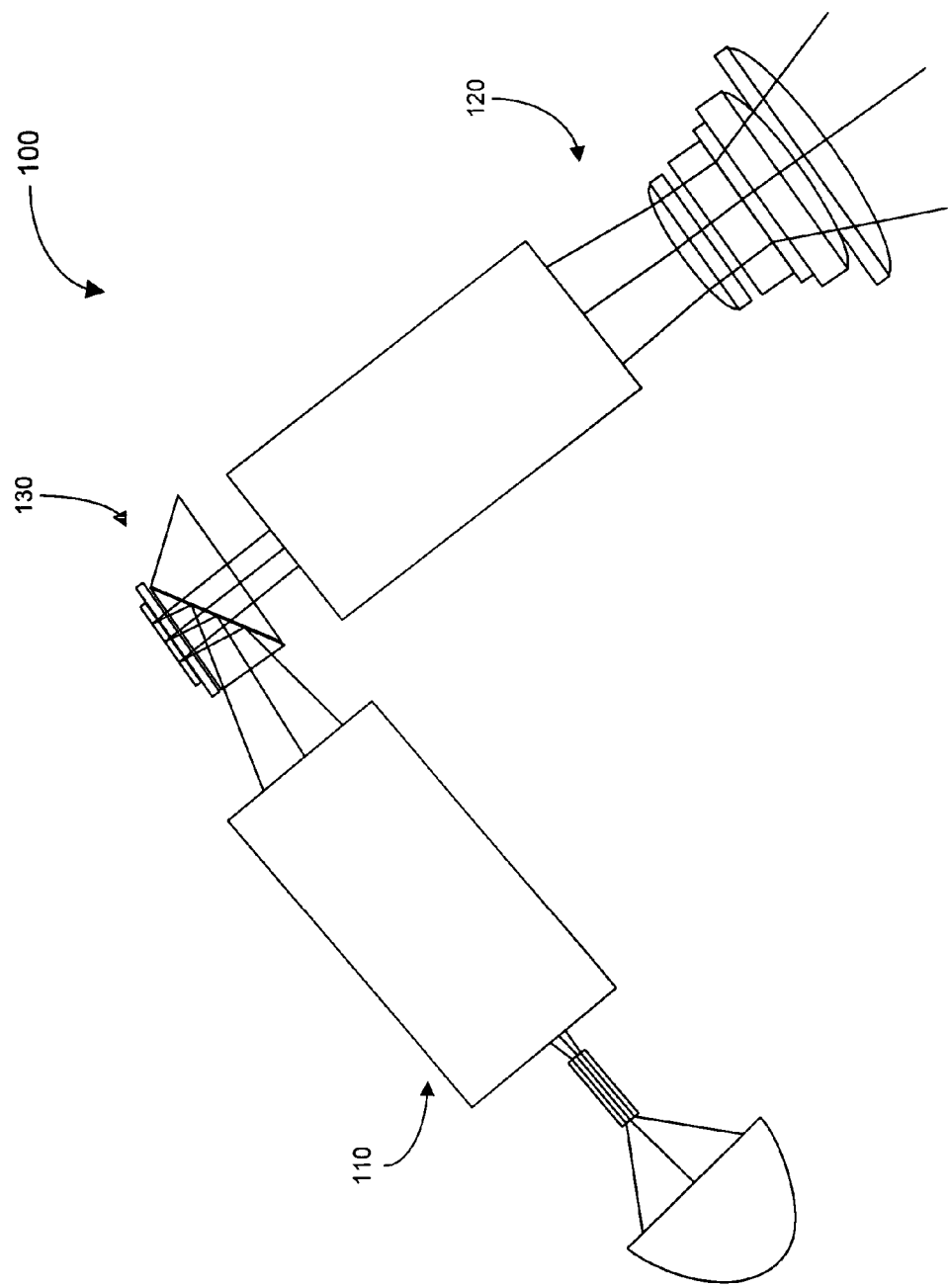
FIG. 1 schematically illustrates a typical digital projector architecture.
Figure 2:
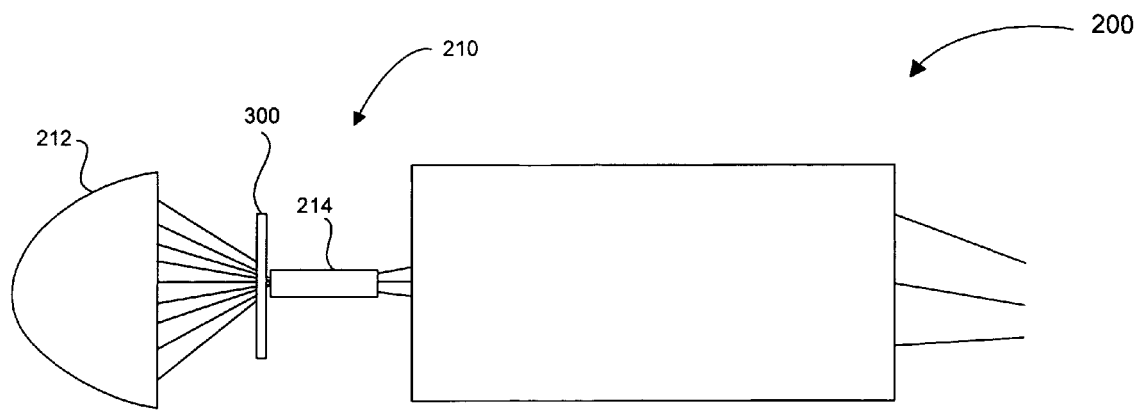
FIG. 2 illustrates the illumination portion of a digital projector according to an embodiment of the invention.

Referring to FIG. 2, an illumination portion 210 of a digital projector 200 is illustrated. As noted above, the digital projector 200 may have an image processing portion and a projection portion in addition to the illumination portion 210. The illumination portion 210 includes a light source 212 and a light integration unit 214, such as an integrating rod or a light pipe. The light integration unit is adapted to integrate light by receiving light at its input that may have a non-uniform spatial distribution of radiance and outputting light at its exit having a substantially uniform distribution of radiance. The light source 212 is adapted to generate a light beam having a light path through the light integration unit 214 and other components of the illumination portion 210 toward the image processing portion.

In the illustrated embodiment, an image enhancement system is formed with the light source 212, the light integration unit 214 and a light intensity modulator 300. The light intensity modulator 300 is positioned along the light path between the light source 212 and the exit of the light integration unit 214.

Placing a disrupter between the light source 212 and the exit of the integrating rod 214 can be advantageous when compared to placing such a disrupter further downstream. In particular, disrupters of most types can cause anomalies or non-uniformities in the light beam. Positioning of the disrupters upstream of the exit of the integrating rod 214 allows the integrating rod 214 to eliminate or reduce the anomalies in the beam.

By positioning the light intensity modulator 300 in the illumination portion 210, light intensity can be modulated for a variety of projection lenses, including those with a zoom capability. Further, by placing the light intensity modulator before the exit of the light integration unit 214, the light beam disrupted by the light intensity modulator 300 can be made uniform by the light integration unit 214. Thus, the image processing portion is provided with a light beam that is uniformly reduced in intensity. This results in decreased scattering of light striking the image processing device, such as a DMD, in the image processing portion. The uniform reduction in intensity may be particularly advantageous for projection images that are dark. By reducing the light falling on the image processing device, the noise generated by scattering of light is also reduced.

The light intensity modulator 300 may be formed in a variety of configurations. In certain embodiments, the light intensity modulator 300 includes a light disrupter adapted to disrupt at least a portion of the light beam from the light source. In a particular embodiment, the disrupter is formed of a light-absorbent material to absorb the disrupted light. In this regard, the disrupter should be capable of handling the heat associated with the high amount of lumens striking the disrupter. In other embodiments, the disrupter is formed of a light-reflective material. In such embodiments, the disrupter is adapted to direct the disrupted light away from the light path. In still other embodiments, the disrupter is formed of a light-transmissive material, such as a glass or a plastic, to bend the disrupted light away from the light path.

Figure 3:
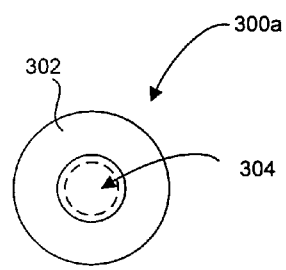
FIG. 3 illustrates a light intensity modulator according to one embodiment of the invention.

FIGS. 3-10 illustrate various embodiments of light intensity modulators in accordance with the invention. For example, FIG. 3 illustrates an embodiment of a light intensity modulator 300a The light intensity modulator 300a includes a disrupter 302 adapted to block light from passing therethrough. The light intensity modulator 300a also includes an iris aperture 304 in the center of the disrupter 302. The size of the iris aperture 304 is variable to adjust the amount of the light beam passing through the aperture. The size of the iris aperture 304 may be varied by increasing or decreasing the diameter of the iris aperture 304. This may be achieved in a variety of manners, including by actuating a motorized mechanism. By thus varying the size of the iris aperture 304, the amount of light reaching the light integration unit can be adjusted.

Figure 4B:
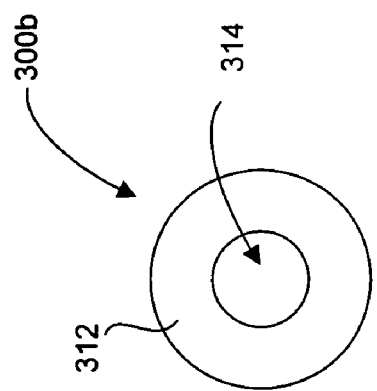
FIG. 4B illustrates the light intensity modulator illustrated in FIG. 4A.
Figure 4A:
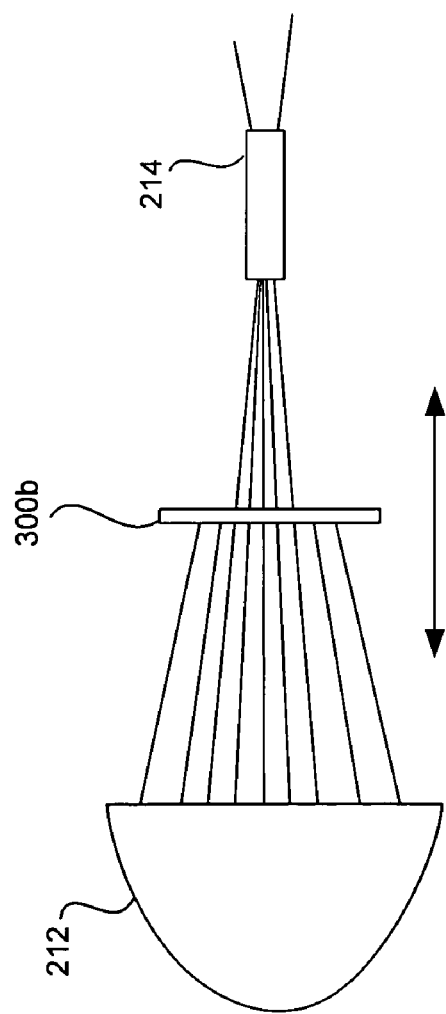
FIG. 4A illustrates the illumination portion of a digital projector having a light intensity modulator according to another embodiment of the invention.

FIG. 4A illustrates the illumination portion of a digital projector having an embodiment of a light intensity modulator, shown in FIG. 4B. In this embodiment, the light intensity modulator 300b includes a disrupter 312 adapted to block light from passing therethrough and an aperture 314. Unlike the embodiment of FIG. 3, the aperture 314 is fixed in size. The amount of the light beam passing through the aperture 314 is adjusted by varying the position of the light intensity modulator 300b along the light path. Thus, when more light is desired to be passed through the aperture 314, the light intensity modulator 300b is translated away from the light source. With the light beam being focused and narrowing near the entrance of the light integration unit 214, more of the light beam can pass through the same aperture. Similarly, when less light is desired to be passed through the aperture 314, the light intensity modulator 300b is translated toward the light source.

Figure 5B:
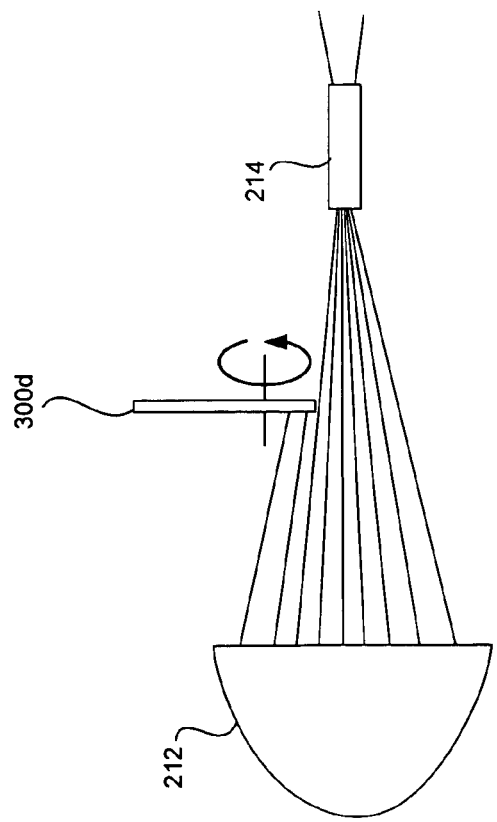
FIGS. 5A and 5B illustrate illumination portions of a digital projector having light intensity modulators according to other embodiments of the invention.
Figure 5A:
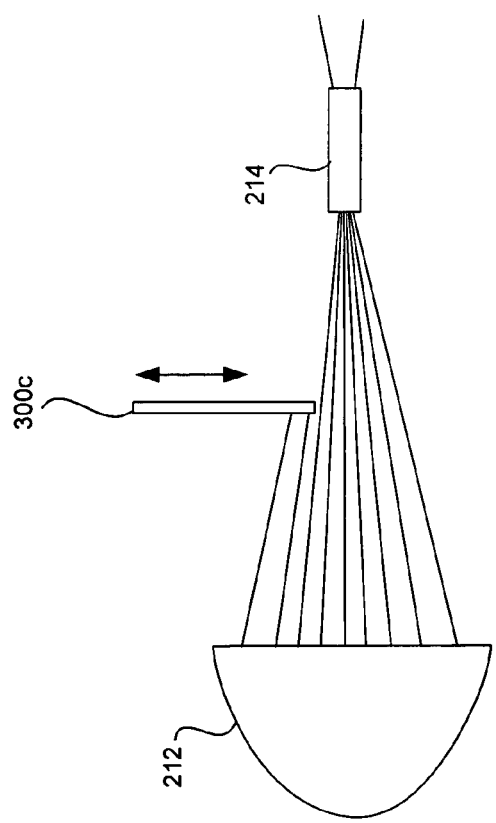

FIG. 5A illustrates the illumination portion of a digital projector having another embodiment of a light intensity modulator. In the illustrated embodiment, the light intensity modulator 300c includes a disrupter formed as a plate. The disrupter is adapted to block light from passing therethrough by, for example, reflecting or absorbing the light. The disrupter of the light intensity modulator 300c is adapted to be translated in a direction that is substantially perpendicular to the light path. To disrupt the light beam, the disrupter of the light intensity modulator 300c is translated into the light path. The amount of disruption is adjusted by varying the amount of translation. Although the disrupted light beam entering the light integration unit 214 is non-symmetrical, the light beam received by the image processing portion is made uniform by passing of the light beam through the light integration unit 214.

FIG. 5B illustrates the illumination portion of a digital projector having a light disrupter according to another embodiment of the invention. As in the embodiment of FIG. 5A, the light intensity modulator 300d of FIG. 5B includes a disrupter formed as a plate to block light from passing therethrough. In the embodiment of FIG. 5B, the disrupter is rotated into the light path by rotating the disrupter about a pivot point. The plate may be formed in a variety of shapes. In one embodiment, the plate is configured such that the amount of the light beam blocked is determined by the amount of rotation of the disrupter.

Figure 6B:
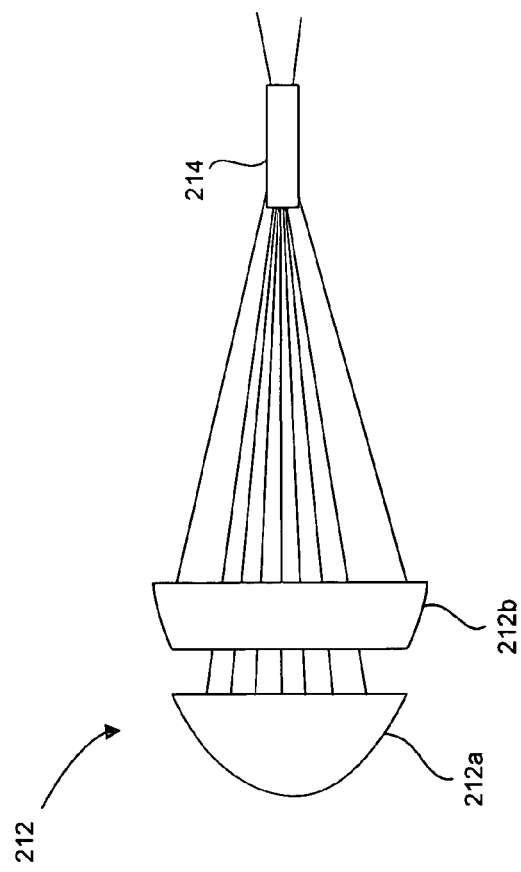
FIGS. 6A and 6B illustrate the illumination portion of a digital projector having a light intensity modulator according to another embodiment of the invention.
Figure 6A:
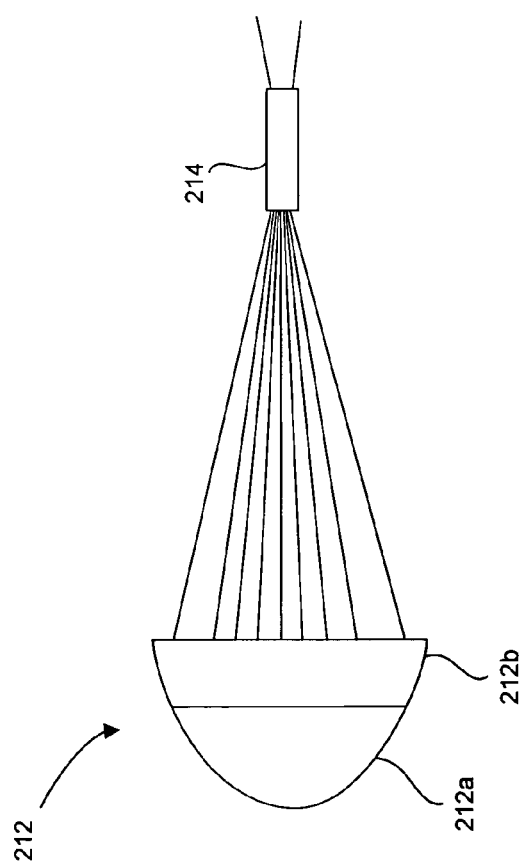

FIGS. 6A and 6B illustrate the illumination portion of a digital projector having a light intensity modulator according to another embodiment of the invention. In this embodiment, the light intensity modulator is implemented as a configuration of a reflector of the light source 212. In the embodiment illustrated in FIGS. 6A and 6B, the light reflector of the light source 212 is formed as two annular segments, including an inner reflector 212a and an outer reflector 212b. The outer reflector 212b forms a disrupter portion that is adapted to be translated along the light path. The translation of the outer reflector 212b may be achieved through a voice coil motor, for example.

When a reduction in the light intensity is desired, the disrupter portion may be translated along the light path, as illustrated in FIG. 6B. In the translated position, a portion of the light beam is focused away from the entrance of the light integration unit 214, thereby reducing the amount of light being directed to the image processing portion.

In other embodiments, the inner reflector may form the disrupter portion. In still other embodiments, rather than being translated, the disrupter portion may be variable in its shape. Thus, a variation in the shape of the disrupter portion may change the focus point of the disrupted portion of the light beam.

Figure 7:
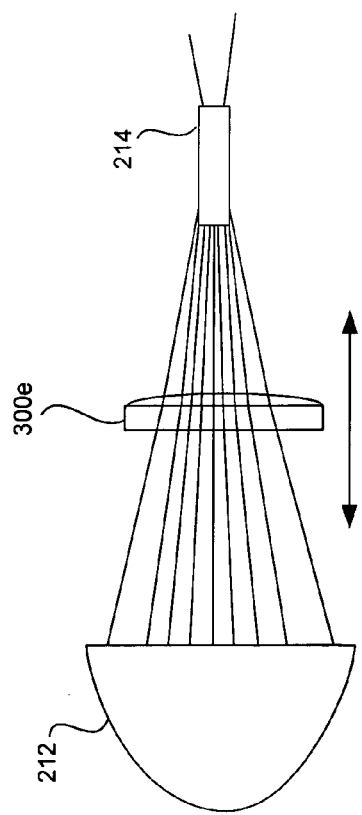
FIG. 7 illustrates the illumination portion of a digital projector having a light intensity modulator according to another embodiment of the invention.

FIG. 7 illustrates the illumination portion of a digital projector having a light intensity modulator according to another embodiment of the invention. In this embodiment, the light intensity modulator includes a lens 300e positioned between the light source 212 and the light integration unit 214. The embodiment illustrated in FIG. 7 is provided with an elliptical light source 212, but may also be implemented with a parabolic lamp. Light from the light source 212 is focused at the entrance of the light integration unit 214 through a lens 300e. In this regard, the lens 303e is adapted to disrupt the light beam by bending the rays of the light beam. The focus point of the light beam is a function of the position of the lens 300e along the light path. Thus, to modulate the light intensity, the focus point of the lens 300e can be moved away from the entrance to the light integration unit 214, thereby reducing the amount of light entering the light integration unit 214. In this regard, the lens is adapted to be translated along the light path to vary the focus point of the light beam.

Figure 8:
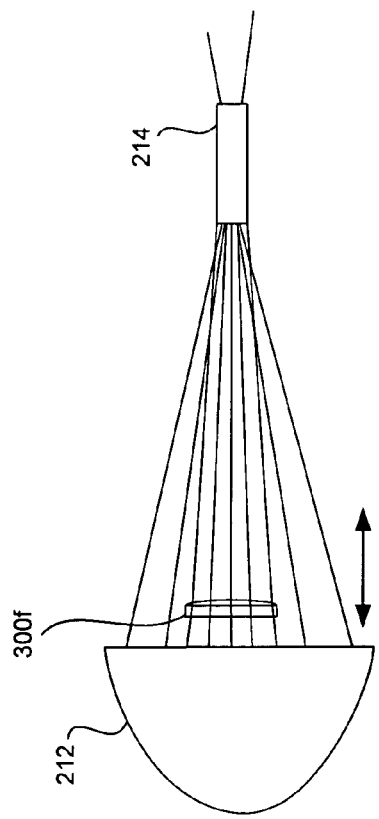
FIG. 8 illustrates the illumination portion of a digital projector having a light intensity modulator according to another embodiment of the invention.

FIG. 8 illustrates another embodiment of a light intensity modulator. The illumination portion of the digital projector illustrated in FIG. 8 includes a light source 212 generating a light beam focused at the entrance of the light integration unit 214. A light intensity modulator formed as a small lens 300f is positioned along the light path. The lens 300f disrupts a central portion of the light beam by defocusing a part of the light beam to reduce the amount of light entering the light integration unit 214. The amount of defocusing is varied by translating the lens 300f along the light path. The lens 300f may be moved to close proximity of the light source 212, into an irradiance hole of a burner of the light source 212, to substantially eliminate any effect on the light beam.

Figure 9:
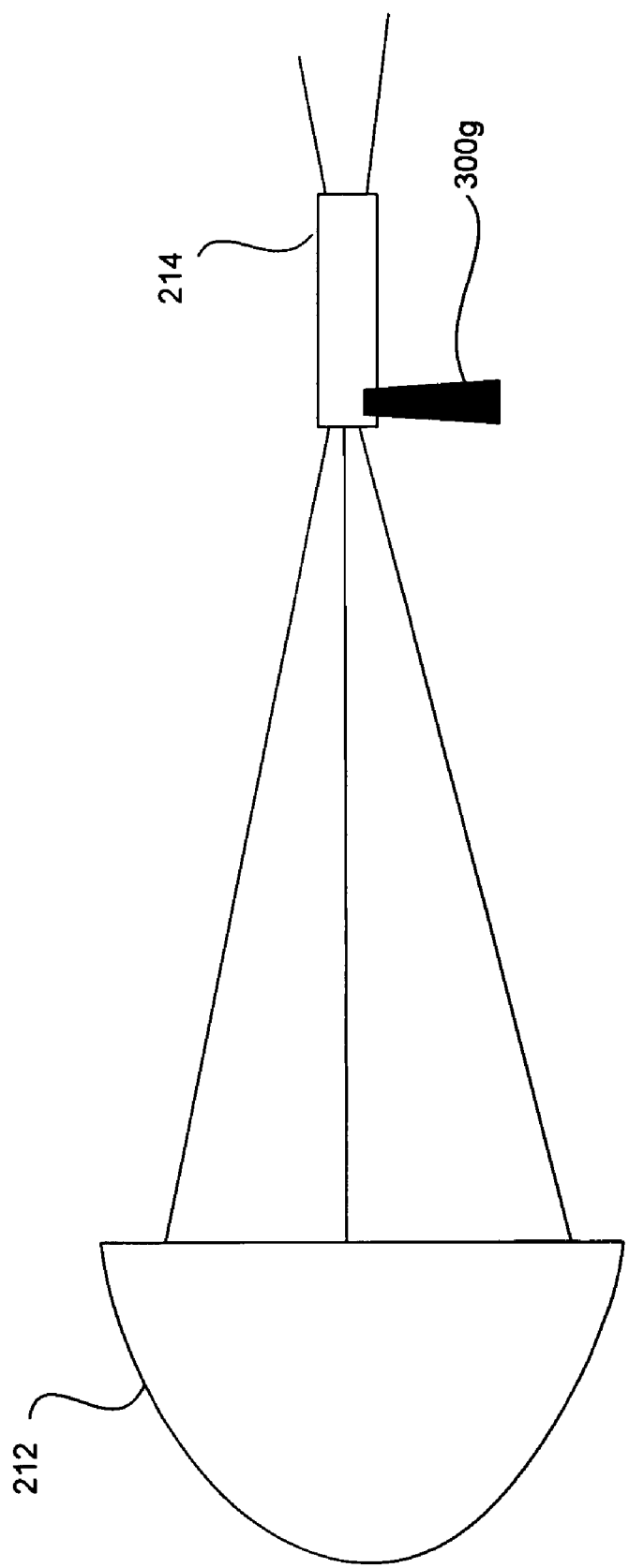
FIG. 9 illustrates the illumination portion of a digital projector having a light intensity modulator according to another embodiment of the invention.

FIG. 9 illustrates the illumination portion of a digital projector having a light disrupter according to another embodiment of the invention. In the embodiment of FIG. 9, the light intensity modulator includes a disrupter 300g formed as a pin. The disrupter is adapted to be inserted into the light integration unit 214 in a direction substantially perpendicular to the light path. The location of the insertion may be selected to ensure uniformity of the light beam exiting the light integration unit 214. In this regard, the disruption should be sufficiently far away from the exit of the light integration unit 214. The intensity of the light beam exiting the light integration unit 214 can be adjusted by varying the amount of insertion of the disrupter 300g into the light integration unit 214.

Figure 10:
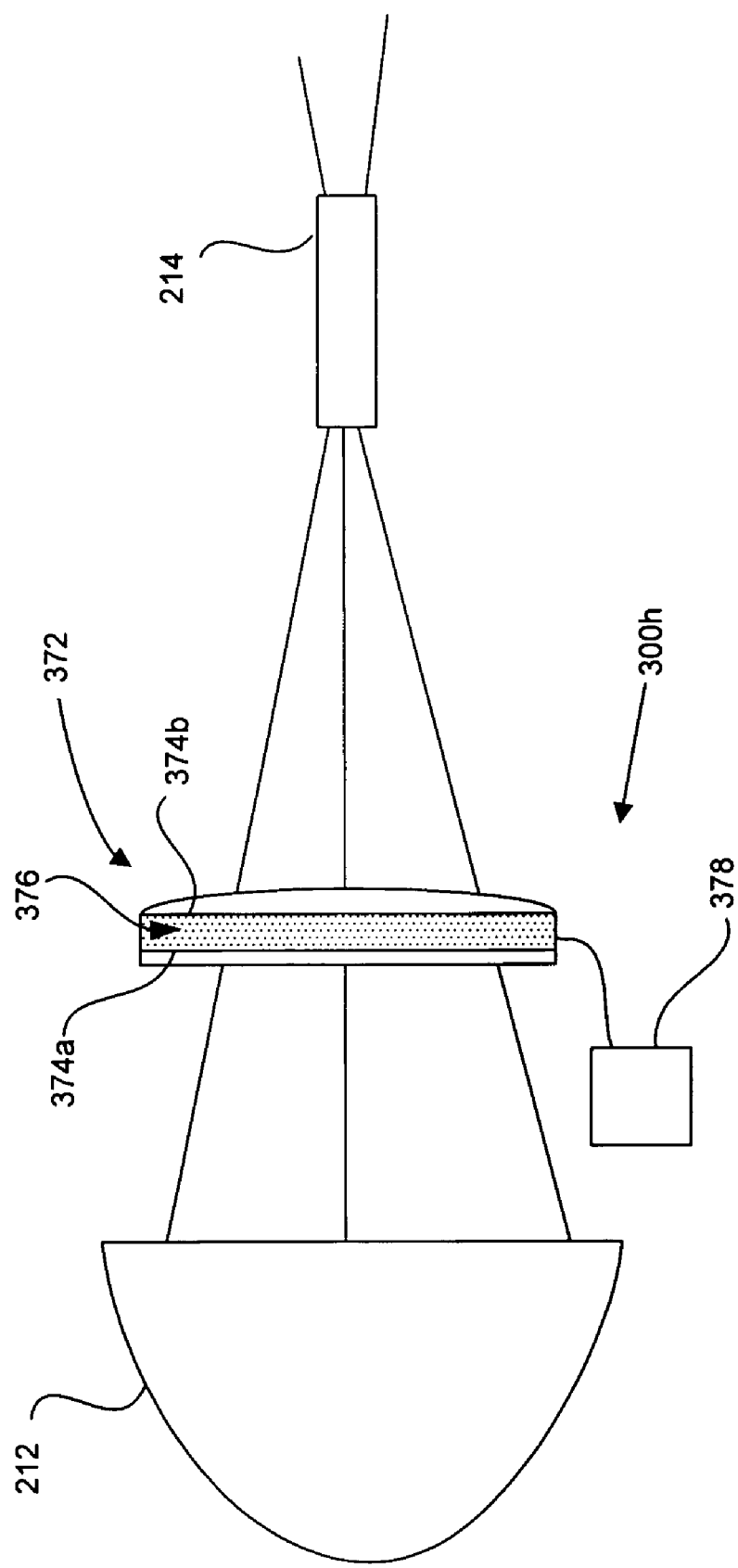
FIG. 10 illustrates the illumination portion of a digital projector having a light intensity modulator according to another embodiment of the invention.

FIG. 10 illustrates the illumination portion of a digital projector having a light intensity modulator according to another embodiment of the invention. The illumination portion of FIG. 10 includes light source 212 and a light integration unit 214. A light intensity modulator 300h includes a disrupter lens 372 positioned in the light path between the light source 212 and the light integration unit 214. The lens 372 includes a pair of walls 374a, 374b forming a fluid portion therebetween. The walls 374a, 374b may be formed as flexible diaphragms. The fluid portion 376 is adapted to hold a fluid therein, the fluid being adapted to disrupt the light by, for example, absorbing at least a portion of the light beam or bending the rays of the light beam. The amount of disruption of the light beam by the disrupter lens 372 may be adjusted by controlling the pressure, density or volume of the fluid in the fluid portion 376. In this regard, the light intensity modulator 300h is provided with a fluid control module 378 adapted to vary the pressure, density or volume of the fluid in the fluid portion. The fluid control module 378 may be provided with a small reservoir of the fluid.

Thus, one aspect of the invention relates to an image enhancement system. The system includes a light source adapted to generate a light beam, a light integration unit positioned along a light path of the light beam, and a light intensity modulator positioned between the light source and an exit of the light integration unit.

In one embodiment, the light intensity modulator includes a light disrupter adapted to disrupt at least a portion of the light beam from the light source. The disrupter is at least one of light-absorbent to absorb the disrupted light, light-reflective to direct the disrupted light away from the light path, and light-transmissive to bend the disrupted light away from the light path.

In a particular embodiment, the modulator includes an iris aperture, a size of the aperture being variable to adjust an amount of the light beam passing through the aperture. In another embodiment, the modulator includes a fixed-size aperture, a position of the modulator along the light path being variable to adjust an amount of the light beam passing through the aperture.

In a particular embodiment, the disrupter is a plate adapted to be translated into the light path, an amount of translation of the plate being variable to adjust an amount of the light beam being disrupted. In another embodiment, the disrupter is a plate adapted to be rotated into the light path, an amount of rotation of the plate being variable to adjust an amount of the light beam being disrupted.

In a particular embodiment, the light intensity modulator includes a disrupter portion of a light reflector of the light source, the disrupter portion being variable in at least one of shape and position. The disrupter portion may be adapted to be translated along the light path to vary the position of the disrupter portion.

In a particular embodiment, the light intensity modulator includes a lens adapted to disrupt the light beam. The lens is further adapted to translate along the light path to vary a focus point of the light beam. The lens may be adapted to disrupt a central portion of the light beam.

In one embodiment, the light intensity modulator includes a disrupter adapted to be inserted into the light integration unit in a direction substantially perpendicular to the light path, an amount of insertion being variable to adjust a light intensity of a light beam exiting the light integration unit. The disrupter may include a pin.

In a particular embodiment, the light intensity modulator includes a disrupter lens, the disrupter lens including a fluid portion containing a fluid. At least one of a pressure, density and volume of the fluid within the fluid portion is variable to adjust an amount of disruption of the light beam.

In another aspect, the invention includes an image enhancement system comprising a light source adapted to generate a light beam, a light integration unit positioned along a light path of the light beam, and a light intensity modulator. The light intensity modulator is adapted to translate along the light path to adjust a light intensity of a light beam exiting the light integration unit.

In another aspect, the invention includes a digital projector comprising an illumination portion for generating a light beam, an image processing portion for receiving the light beam and processing an image, and a projection portion for projecting the processed image. The illumination portion includes a light source adapted to generate the light beam, a light integration unit positioned along a light path of the light beam, and a light intensity modulator positioned between the light source and an exit of the light integration unit.

In another aspect, the invention includes a digital projector comprising an illumination portion for generating a light beam, an image processing portion for receiving the light beam and processing an image, and a projection portion for projecting the processed image. The illumination portion includes a light source adapted to generate a light beam, a light integration unit positioned along a light path of the light beam, and a light intensity modulator adapted to translate along the light path to adjust a light intensity of a light beam exiting the light integration unit.

Another aspect of the invention includes a method for enhancing contrast in a digital projector. The method includes generating a light beam from a light source along a light path toward a light integration unit and actuating a light intensity modulator positioned between the light source and an exit of the light integration unit.

In another aspect of the invention, a method for enhancing contrast in a digital projector includes generating a light beam from a light source along a light path toward a light integration unit and translating a light intensity modulator along the light path to adjust a light intensity of a light beam exiting the light integration unit.

The foregoing description of the preferred embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

What is claimed is:

1. An image enhancement system, comprising:
 a light source configured to generate a light beam;
 a light integration unit positioned along a light path of the light beam; and
 a light intensity modulator positioned between the light source and an exit of the light integration unit, wherein the light intensity modulator includes a disrupter configured to be inserted into the light integration unit in a direction substantially perpendicular to the light path, an amount of insertion being variable to adjust a light intensity of a variable light beam exiting the light integration unit.

2. The system of claim 1, the disrupter configured to disrupt at least a portion of the light beam from the light source, the disrupter being at least one of light absorbent to absorb the disrupted light, light-reflective to direct the disrupted light away from the light path, and light-transmissive to bend the disrupted light away from the light path.

3. The system of claim 1, wherein the disrupter includes a pin.

4. An image enhancement system, comprising:
   a light source configured to generate a light beam;
   a light integration unit positioned along a light path of the light beam; and
   a light intensity modulator including a light disrupter inserted into the light integration unit and configured to translate in a direction substantially perpendicular to the light path to adjust a light intensity of a variable light beam exiting the light integration unit.

5. The system of claim 4, wherein the light intensity modulator includes the light disrupter configured to disrupt at least a portion of the light beam from the light source, the disrupter being at least one of light absorbent to absorb the disrupted light, light-reflective to direct the disrupted light away from the light path, and light-transmissive to bend the disrupted light away from the light path.

6. A digital projector, comprising:
   an illumination portion for generating a light beam;
   an image processing portion for receiving the light beam and processing an image; and
   a projection portion for projecting the processed image;
   wherein the illumination portion comprises:
      a light source configured to generate the light beam;
      a light integration unit positioned along a light path of the light beam; and
      a light intensity modulator positioned between the light source and an exit of the light integration unit, the light intensity modulator including a disrupter configured to be inserted into the light integration unit in a direction substantially perpendicular to the light path, an amount of insertion being variable to adjust a light intensity of a variable light beam exiting the light integration unit.

7. A digital projector, comprising:
   an illumination portion for generating a light beam;
   an image processing portion for receiving the light beam and processing an image; and
   a projection portion for projecting the processed image;
   wherein the illumination portion comprises:
      a light source configured to generate a light beam;
      a light integration unit positioned along a light path of the light beam; and
      a light intensity modulator configured to translate in a direction substantially perpendicular to the light path within the light integration unit to adjust a light intensity of a variable light beam exiting the light integration unit.

8. A method for enhancing contrast in a digital projector, comprising:
   generating a light beam from a light source along a light path toward a light integration unit; and
   actuating a light intensity modulator positioned between the light source and an exit of the light integration unit, wherein the step of actuating includes inserting a disrupter into the light integration unit in a direction substantially perpendicular to the light path, an amount of insertion being variable to adjust a light intensity of a variable light beam exiting the light integration unit.

9. The method of claim 8, wherein the step of actuating includes disrupting at least a portion of the light beam from the light source by at least one of absorbing the disrupted light, reflecting the disrupted light away from the light path, and bending the disrupted light away from the light path.

10. The method of claim 8, wherein the disrupter includes a pin.

11. A method for enhancing contrast in a digital projector, comprising:
    generating a light beam from a light source along a light path toward a light integration unit; and
    translating a light intensity modulator formed as a pin substantially perpendicular the light path to adjust a light intensity of a variable light beam exiting the light integration unit.

12. The method of claim 11, wherein the step of translating includes disrupting at least a portion of the light beam from the light source by at least one of absorbing the disrupted light, reflecting the disrupted light away from the light path, and bending the disrupted light away from the light path.

13. An image enhancement system, comprising:
    means for generating a light beam;
    means for integrating light positioned along a light path of the light beam; and
    means for modulating light intensity positioned between an entry and an exit of the means for integrating light by varying the amount of insertion of a disrupter substantially perpendicular to the light path into the means for integrating light.

* * * * *

UNITED STATES PATENT AND TRADEMARK OFFICE
CERTIFICATE OF CORRECTION

PATENT NO. : 7,249,855 B2  Page 1 of 1
APPLICATION NO. : 11/019695
DATED : July 31, 2007
INVENTOR(S) : David L. Erickson et al.

It is certified that error appears in the above-identified patent and that said Letters Patent is hereby corrected as shown below:

Title Page, Item (56), under "Foreign Patent Documents", delete
"JP   2004-157401   5/2004". (Entry Repeated)

Signed and Sealed this

Twelfth Day of August, 2008

JON W. DUDAS
*Director of the United States Patent and Trademark Office*